(12) United States Patent
Hennings (10) Patent No.: US 10,367,987 B2
(45) Date of Patent: Jul. 30, 2019

(54) SYSTEM AND METHOD FOR SENSOR-DRIVEN AUTOMATIC DEVICE INTERACTION

(71) Applicant: SMPL Inc., Austin, TX (US)

(72) Inventor: Mark Thomas Hennings, Highlands Ranch, CO (US)

(73) Assignee: SMPL Inc., Austin, TX (US)

( * ) Notice: Subject to any disclaimer, the term of this patent is extended or adjusted under 35 U.S.C. 154(b) by 0 days.

(21) Appl. No.: 16/054,349

(22) Filed: Aug. 3, 2018

(65) Prior Publication Data

US 2019/0045107 A1 Feb. 7, 2019

Related U.S. Application Data

(60) Provisional application No. 62/541,094, filed on Aug. 4, 2017.

(51) Int. Cl.
*H04N 5/232* (2006.01)

(52) U.S. Cl.
CPC ..... *H04N 5/23203* (2013.01); *H04N 5/23218* (2018.08); *H04N 5/23251* (2013.01); *H04N 5/232127* (2018.08)

(58) Field of Classification Search
CPC .......... H04N 5/23203; H04N 5/23251; H04N 5/23218; H04N 5/232127
USPC ....................................................... 707/600
See application file for complete search history.

(56) References Cited

U.S. PATENT DOCUMENTS

| 9,596,398 B2 | 3/2017 | Khawand |
| 2004/0130628 A1 | 7/2004 | Stavely |
| 2008/0231714 A1 | 9/2008 | Estevez et al. |
| 2009/0174782 A1 | 7/2009 | Kahn |

*Primary Examiner* — Joshua Bullock
(74) *Attorney, Agent, or Firm* — Shah IP Law, PLLC; Samar Shah (57) ABSTRACT

A system and method for sensor-driven automatic device interaction, comprising a sensor aggregator that receives a plurality of sensor data from a plurality of hardware sensors, analyzes at least a portion of the sensor data, determines a sensor threshold, iteratively compares the results of the analysis to the sensor threshold, and directs the operation of a camera based on the results of the comparison.

9 Claims, 8 Drawing Sheets

Fig. 8

SYSTEM AND METHOD FOR SENSOR-DRIVEN AUTOMATIC DEVICE INTERACTION

CROSS-REFERENCE TO RELATED APPLICATIONS

This application claims priority to U.S. Provisional Patent Application Ser. No. 62/541,094, filed Aug. 4, 2017, entitled "SYSTEM AND METHOD FOR SENSOR-DRIVEN AUTOMATIC CAMERA INTERACTION" the entire content of which is incorporated herein by reference.

BACKGROUND

Field of the Art

The disclosure relates to the field of device stabilization, and more particularly to the field of utilizing onboard device sensors to automatically direct the behavior of a device.

Discussion of the State of the Art

It is common practice with smart phones that come with cameras on the same side as the display screen, to take a "selfie" by holding the camera out and pressing a button to trigger the shutter. However, many times the very act of pressing a button adds additional motion to the camera, resulting in a blurry photo—especially in low light conditions. In addition, it can be precarious holding the phone out and having to use a thumb or other finger. Many phones have been dropped because of this awkward requirement and some people have been injured or died because of the high amount of attention required to take a good selfie in precarious situations.

What is needed, is a means to eliminate the need for a button press to operate the camera, using device sensors to automatically direct camera operation to ensure the safety of the user as well as the capture of an ideal photograph.

SUMMARY

Accordingly, the inventor has conceived and reduced to practice, a system and method for sensor-driven automatic camera interaction.

According to one aspect, a system for sensor-driven automatic camera interaction, comprising a sensor aggregator comprising at least a processor, a memory, and a plurality of programming instructions stored in the memory and operating on the processor, wherein the programmable instructions, when operating on the processor, cause the processor to: receive sensor data from a plurality of hardware sensors; analyze at least a portion of the sensor data; determine a sensor threshold; compare the results of the analysis to the sensor threshold; and direct the operation of a camera based on the results of the comparison, is disclosed.

According to another aspect, a method for sensor-driven automatic camera interaction, comprising the steps of: receiving, at a sensor aggregator comprising at least a processor, a memory, and a plurality of programming instructions stored in the memory and operating on the processor, sensor data from a plurality of hardware sensors; analyzing at least a portion of the sensor data; determining a sensor threshold; comparing the results of the analysis to the sensor threshold; and directing the operation of a hardware camera based on the results of the comparison, is disclosed.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

The inventor has conceived, and reduced to practice, a system and method for sensor-driven automatic camera interaction.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

Conceptual Architecture

Figure 1:
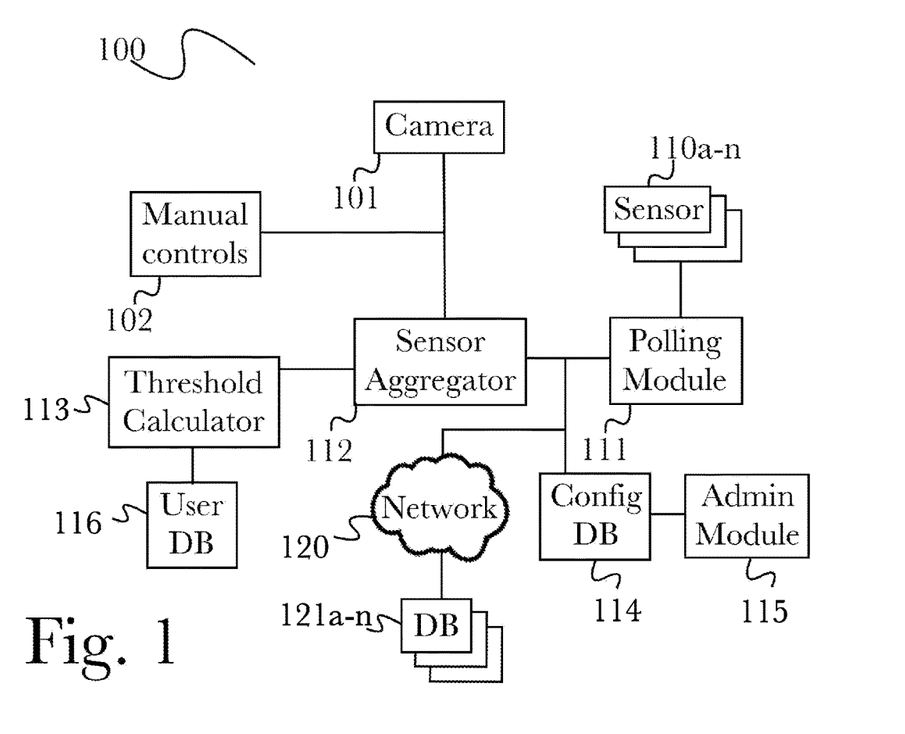
FIG. 1 is a block diagram illustrating an exemplary system architecture for sensor-driven automatic camera interaction, according to a preferred embodiment of the invention.

FIG. 1 is a block diagram illustrating an exemplary system architecture 100 for sensor-driven automatic camera interaction, according to a preferred embodiment of the invention. According to the embodiment, a camera 101 may be controlled ordinarily via a variety of manual controls 102, such as (for example, including but not limited to) a physical shutter button, zoom control such as a slider, or on-screen controls such as in the case of a smartphone or similar mobile device with a camera 101. This commonly requires a user to directly operate the camera 101 in order to take photographs, which may not always be easy or safe (for example, attempting to take a "selfie" picture in an awkward position or hazardous environment, such as on a bridge or a busy street). Moreover, it is often difficult for users to take high-quality photographs when hand-holding a camera 101, moving about, or taking a photograph with multiple moving subjects because of the motion and interference that is typically associated with such an operation. For example, group photographs or photographs taken from hand-held cameras 101 often suffer from motion blur and have other artifacts that often degrade the perceived quality or visual appeal of a photograph. The invention claimed and disclosed herein automates the camera operation to reduce the number of steps that a user has to take to capture a photograph, and at the same time, enables the camera 101 to take photographs that are more visually appealing by reducing, for example, motion blur that may otherwise be captured in a photograph. To automate camera operation, and to take high-quality photographs, by, for example, reducing motion blur in captured photographs, the inventive system and method disclosed herein, utilize information from and related to one or more of the following: one or more sensors, the camera 101, and historical data associated with one or more users. In one embodiment, the inventive system and method utilize a plurality of hardware sensors 110a-n such as (for example, including but not limited to) accelerometer, gyroscope, compass, barometer, or other sensor types to automate certain camera functions and to take photographs that are more visually appealing, by, for example, reducing motion blur in captured photographs. Specifically, in one embodiment, one or more hardware sensors 110a-n may be polled by a polling module 111 to collect sensor data and provide it to a sensor aggregator 112. Sensor aggregator 112 may then analyze the sensor data and a threshold calculator 113 may determine if a configured threshold is met (as described below in FIG. 3) or, in some embodiments, optionally configure a new threshold or modify an existing threshold based on the received sensor data. For example, a configured threshold may define a specific value for an accelerometer or gyroscope sensor, which may suggest that the camera 101 is stationary for a period of time that is sufficient to take a visually appealing photograph, including, for example, a photograph with minimal motion blur. In one embodiment, the threshold may be adjusted to account for the shutter speed that may be set by the camera 101 to take a picture. For example, if the shutter speed is slow, and likely to produce a photograph that may include motion blur, then the threshold for amount of stability required to take a photograph may be changed. In another example, the threshold may be adjusted to account for time data as may be received from the camera 101. Once the sensor aggregator 112 determines that a pre-calculated or a newly calculated threshold is met, then the camera 101 may be directed to capture one or more images.

Various operational parameters or features of polling module 111, sensor aggregator 112 and threshold calculator 113 may be determined from stored information in one or more databases, such as (for example, including but not limited to) a configuration database 114 that may store and provide operation configuration such as sensor thresholds or polling rates, and may be configured through an administration module 115 to set these stored values. A user database 116 may store and provide user-related information, including, but not limited to user-specific adaptations, thresholds, or user account information. The databases, including the user database 116, configuration database 114, and admin module 115 may be incorporated in or accessibly by a plurality of remote databases 121a-n, which may be accessible via a network 120 to enable remote configuration or administration of a connected device 100.

Thresholds for directing a camera may be personalized to each one or more users or devices that may utilize the inventive system and method disclosed herein. Generally, a threshold may be personalized by modifying, gradually and over time, a general threshold to accommodate a user's particular movements, posture, or general tendencies. For example, if a user tends to shake the camera 101 at a particular rate after hand-holding it for a pre-determined amount of time, then the relevant threshold may be modified to accommodate this particular tendency. This feature may be implemented, as also described elsewhere in the specification, by raising the target value associated with a motion sensor readout after a pre-determined amount of time, i.e., the threshold may be more lenient after a user has hand-held the camera for a pre-determined period of time. This concept may be implemented in a variety of other ways. For example, the motion sensor target value may be raised or lowered depending on the amount of time that a user has hand-held the camera 101. Other tendencies may be incorporated in personalized threshold as well, including, but not limited to, the amount of time it takes a user to position a subject within a frame, the amount of time it takes the user to position the camera, the amount of movement that the subject typically makes during one or more predetermined time periods, if the camera 101 is positioned at a desired or preferred angle and/or distance from the subject, etc. When a threshold is met, the camera 101 may be directed to perform an operation without the aid of manual controls 102, providing automated camera operation through monitoring one or more of the following: onboard hardware sensors 110a-n, user database 116, and/or camera 101. In one embodiment, the user tendencies may be aggregated. For example, in some arrangements, a form of multi-user capacity may be provided for by producing user-specific thresholds for multiple users based on their specific movement patterns or other sensor-derived data. According to a particular arrangement or use case, a user may be prompted or presented with the option to select from a plurality of available threshold models, which may (for example) be identified in a variety of ways, such as by user name or sensor type (for example, selecting "use accelerometer" or "use Bob"). This may be used to provide multi-user capabilities for a camera even on devices that may not ordinarily provide such capacity at the hardware or operating system level (as is common with mobile devices that are primarily designed for use by a single user).

In some use cases, a combination of manual controls 102 and sensor-driven operation may be used, for example to enable a user to manually control certain camera functions such as zoom or focus, while sensors drive the operation of the camera shutter or other functions. Another exemplary use of combined operation may be a manually-operated camera that may override the user's manual input, for example as a safety feature to lock out certain camera functions based on sensor information. For example, if a user if moving rapidly (as may indicate they are driving), camera operation may be limited or disabled, or a warning or confirmation prompt may be presented to the user (in a smartphone or similar device arrangement). It should be appreciated that a wide variety of arrangements and use cases may be possible utilizing the sensor-driven camera operation of the aspect, and the specific nature of camera operation, sensor types, or threshold values may vary according to an intended use case or the nature of the device being used.

Not all mobile devices or cameras may have the same hardware sensors, and thresholds may be adapted to utilize available sensors. Another example may be a digital camera that is not a smartphone or other "smart" mobile device, that may have very limited hardware sensors onboard. In such an arrangement, the camera itself may be considered a logical sensor, providing optical or photographic data that may be polled and analyzed accordingly. For example, by analyzing the view through the camera, it may be inferred that the camera is being held in a safe and steady position when the image falls below a certain variance threshold (that is, when the view through the camera is sufficiently steady and not changing rapidly, as would be a clear indicator of movement).

Detailed Description of Exemplary Embodiments

Figure 2:
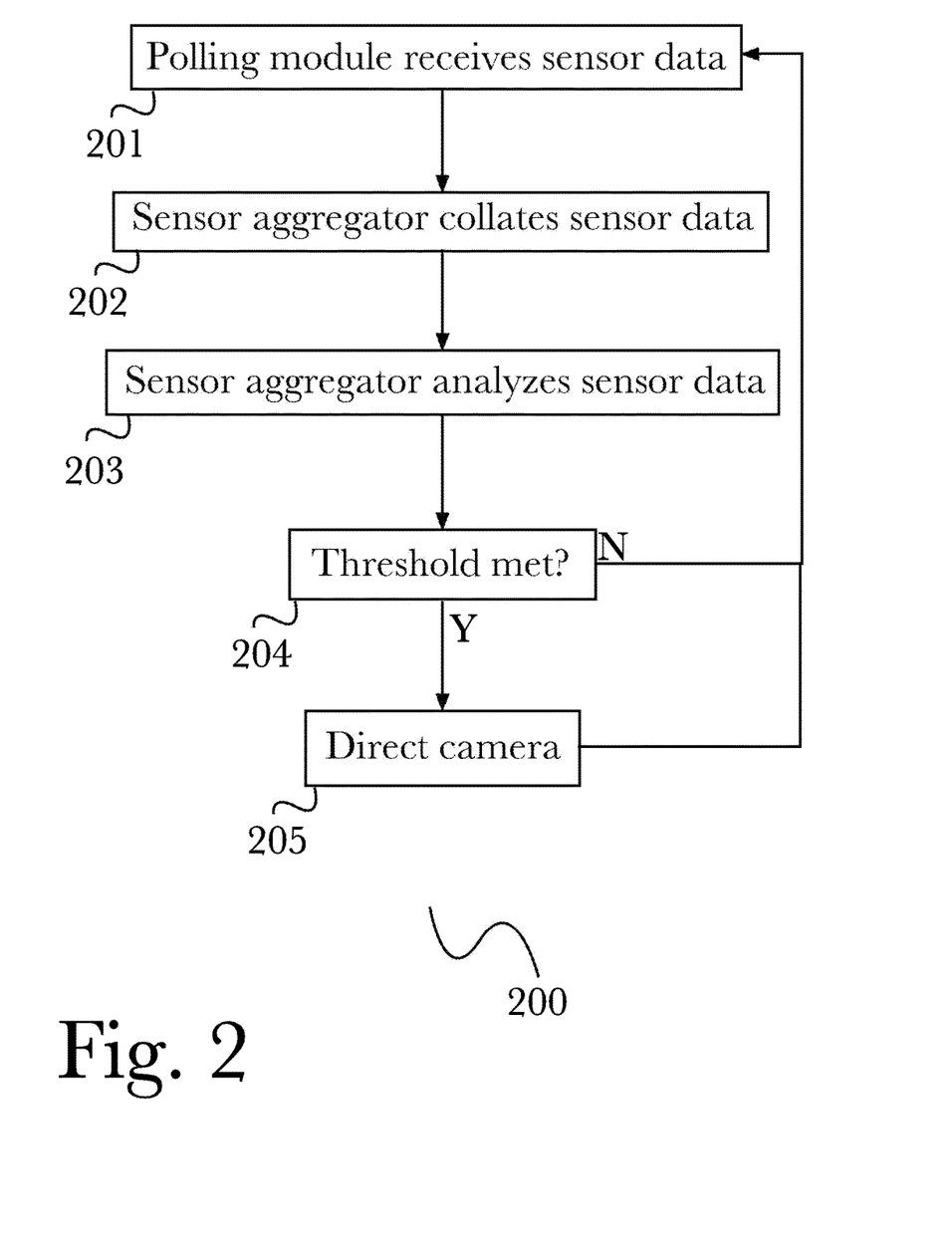
FIG. 2 is a flow diagram illustrating an exemplary method for sensor-driven automatic camera interaction, according to a preferred embodiment of the invention.

FIG. 2 is a flow diagram illustrating an exemplary method 200 for sensor-driven automatic camera interaction, according to one aspect. According to the aspect, in an initial step 201 a polling module 111 may receive sensor data from a plurality of hardware sensors 110a-n, such as (for example, including but not limited to) accelerometer, gyroscope, compass, barometer, or other sensor data. This sensor data may then be provided to a sensor aggregator 112, which may collate 202 and analyze 203 the data. The analysis may include comparing a number of data points against each other to identify patterns or trends (such as to determine that movement of the camera is slowing down, for example) and/or to compare sensor data against threshold values. If a threshold value is met 204, such as (for example, including but not limited to) a sufficiently low degree of movement, or a particular angle or orientation, the sensor aggregator 112 may direct the operation 205 of a camera 101, such as to operate the shutter and take a photograph based on the sensor data and threshold values. If a threshold value is not met, operation may continue with further sensor data polling 201, so that the camera may continue to monitor for the appropriate moment (as determined by the sensor data and threshold values) to operate.

Figure 3:
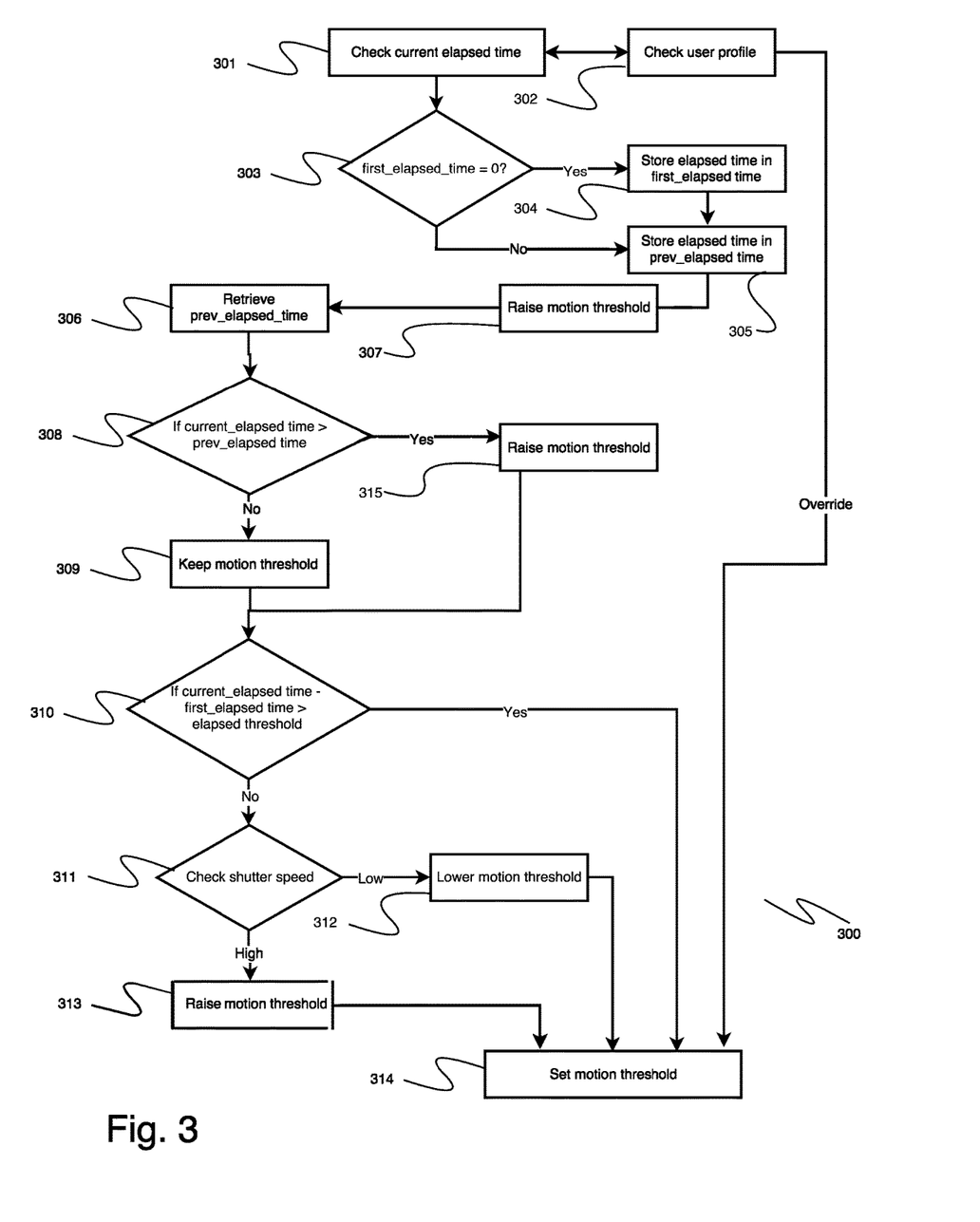
FIG. 3 is a flow diagram illustrating an exemplary method for dynamic calculation of a motion-based sensor threshold value, according to a preferred embodiment of the invention.

FIG. 3 is a flow diagram illustrating an exemplary method 300 for dynamically calculating and setting a threshold value, in accordance with one embodiment of the invention. As described above, the threshold value is used to direct the camera 101, by, for example, directing it to capture a photograph, change the aperture, change the shutter speed, change the sensitivity, etc. In effect, the threshold value pre-determines conditions for taking a photograph. And, when the conditions are met (i.e. the threshold is satisfied), the camera 101 is directed to perform an action, such as capturing a photograph without additional user input. FIG. 3 illustrates a process for setting a threshold related to motion data, but the process may be used or modified to calculate other types of thresholds, in accordance with the description in this specification. The method begins by first checking the current elapsed time 301 since the camera was initiated (generally, by starting a camera software app or activating a camera mode on a device). The elapsed time value may measure a number of items, including, but not limited to, the amount of time that has elapsed between two a change in motion. Thus, if a user is able to hold the camera steady for a long time, then the elapsed time value may be large. If, however, the user in able to hold the camera steady for only a short amount of time, then the elapsed time value may be small. In one embodiment, the elapsed time value may be calculated based on the amount of time that passes between a first motion sensor value and a second, changed, motion sensor value. In one embodiment, the threshold calculator 113 may check for the presence of an existing user profile 302, and if present may load any configured threshold data associated with the user. This may optionally include overriding a threshold-determination process entirely and directly setting a threshold 314 as configured in the user's profile, according to the particular profile setup. If the process is not overridden, then it continues by determining whether the value of a variable storing the initial elapsed time is set to 0 303, and if so 304 the value may then be changed to the current elapsed time. If the value is not 0, such as, if step 304 had been previously performed, then the current elapsed time is stored in a variable for the previous elapsed time separately 305. In one embodiment, the elapsed times may be stored in a table or an array, with each subsequent time entered into a new row. This allows incremental time checks to be compared and stored, enforcing a stateful model of the elapsed time during operation.

After setting or updating the elapsed time accordingly, a preliminary motion threshold may be raised 307 to restrict the criteria for camera activation before checking the previously-set elapsed time variable 306 again. In some embodiments, this step of raising the motion threshold 307 need not be performed. In such an instance, for example, a motion threshold may be set arbitrarily or may be set based on some pre-determined assumptions or calculations based on the value of the current elapsed time that is recorded in step 301. If the current elapsed time exceeds the previous elapsed time 308, as may indicate that a user is able to hold the camera sufficiently steady for a photograph to be taken, the motion threshold may be raised 315 (or raised again) ensure it is not too lax. If the previously-recorded elapsed time is equal or greater than the current, the motion threshold may be kept 309. When the difference between the current and initial motion threshold values exceeds the elapsed threshold value 310 (that is, the motion threshold with elapsed time values), the threshold may be set 314 and normal sensor aggregation and operation may begin (as an appropriate threshold has now been determined for the user). If not, the camera's shutter speeds may be checked 311 to bring an external constant into consideration, and if the shutter speed is low the motion threshold may be lowered 312 before being set 314 (to accommodate a threshold appropriate for the camera hardware), and if the shutter speed is high the motion threshold may be raised 313 and set 314 to again set a value appropriate for the hardware. It should be appreciated that, in some embodiments, what defines a shutter speed being "low" may be dependent on available light, or based on the subject, for example an environment such as a sporting event that may have increased motion. In some embodiments, a low shutter speed is defined as being too low to freeze action when a still image is captured. A high shutter speed may refer, in some embodiments, to a fast shutter speed, whereby the faster the shutter speed, the shorter the time the image sensor is exposed to light. For example, if the subject of a photograph is birds, a sufficient shutter speed may be $\frac{1}{1000}$th second or faster. However, for general photography of slower-moving subjects, images may be properly captured at $\frac{1}{200}$th second, $\frac{1}{100}$th second, or even longer without introducing motion blur low and high shutter speeds, as used herein, is with reference to image capture to freeze motion.

Figure 4:
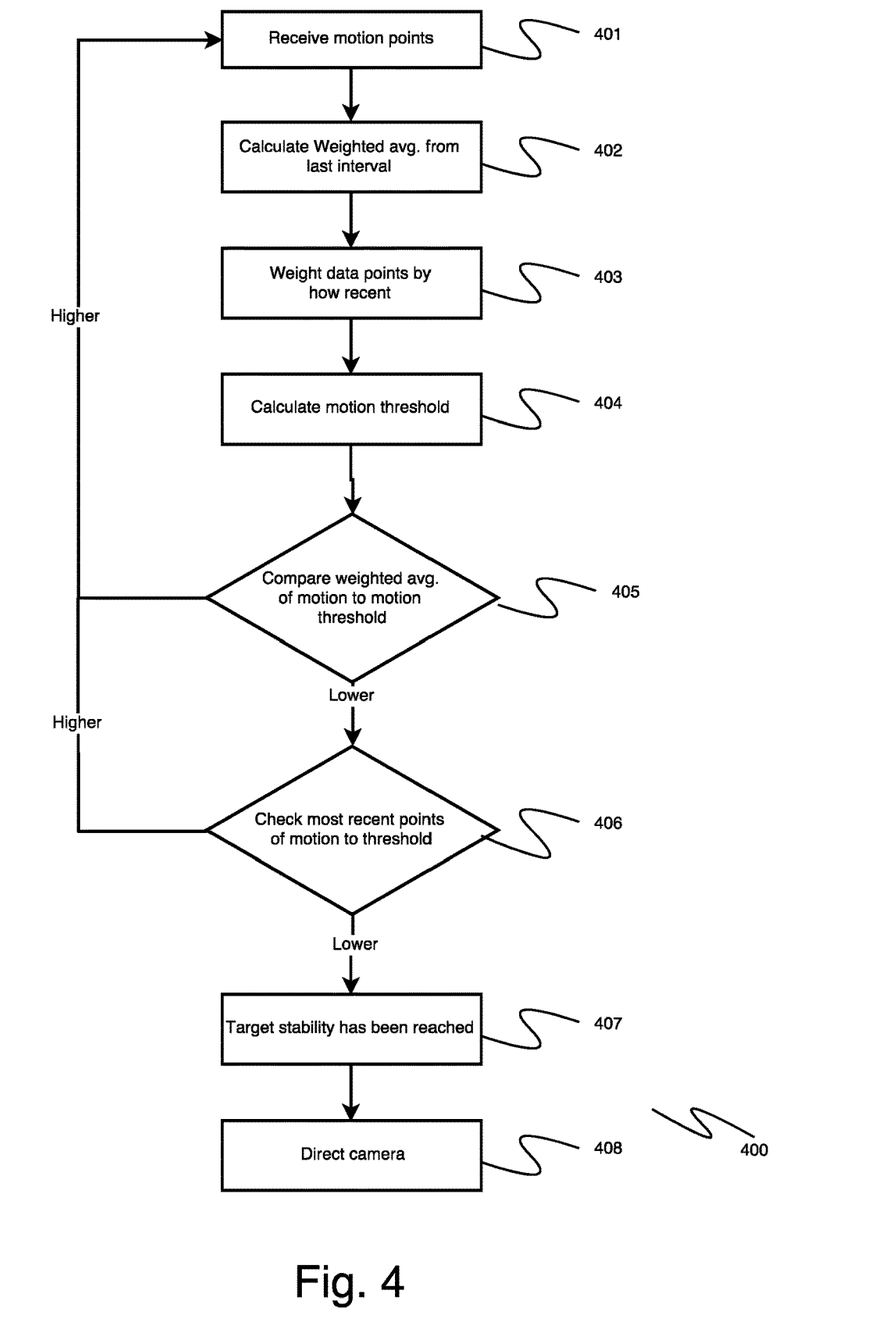
FIG. 4 is a flow diagram illustrating an exemplary method for calculating when a target stability has been reached, according to a preferred embodiment of the invention.

FIG. 4 is a flow diagram illustrating an exemplary method 400 for calculating when a target stability has been reached, according to an aspect. According to the aspect, in an initial step 401 a sensor aggregator 112 may receive a plurality of motion data points from a polling module 111 monitoring a plurality of hardware sensors 110a-n, such as instantaneous recordings of gyroscope data to detect the position and orientation of the device. These points may be used to calculate a weighted average of motion data over the last interval between camera activations 402, and data points may be weighted based on how recently they were captured 403. A motion threshold may be calculated 404 by a threshold calculator (this process is described in detail above, referring to FIG. 3), and the weighted average of motion data may then be compared to the established motion threshold 405. If the threshold is too high, data collection may continue at step 401, and if too low (that is, if the device is sufficiently stationary) the most-recent data points may be checked against the threshold value 406. If the recent data points meet the threshold requirements, a target stability has been reached 407 and the device is sufficiently steady, and the sensor aggregator 112 may direct the operation of camera hardware 408 such as to activate the shutter, adjust focus, or other camera operations as configured (as described above, in FIG. 1).

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 5:
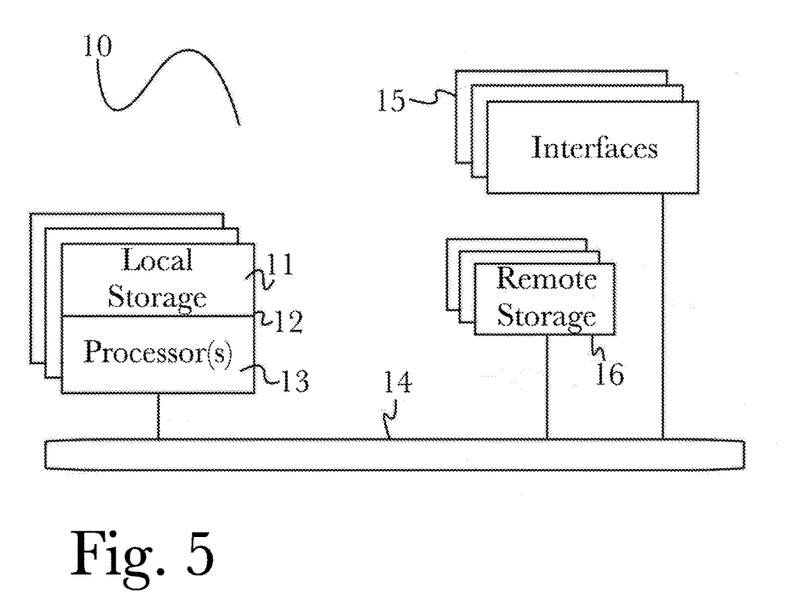
FIG. 5 is a block diagram illustrating an exemplary hardware architecture of a computing device, according to a preferred embodiment of the invention.

Referring now to FIG. 5, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 5 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 6:
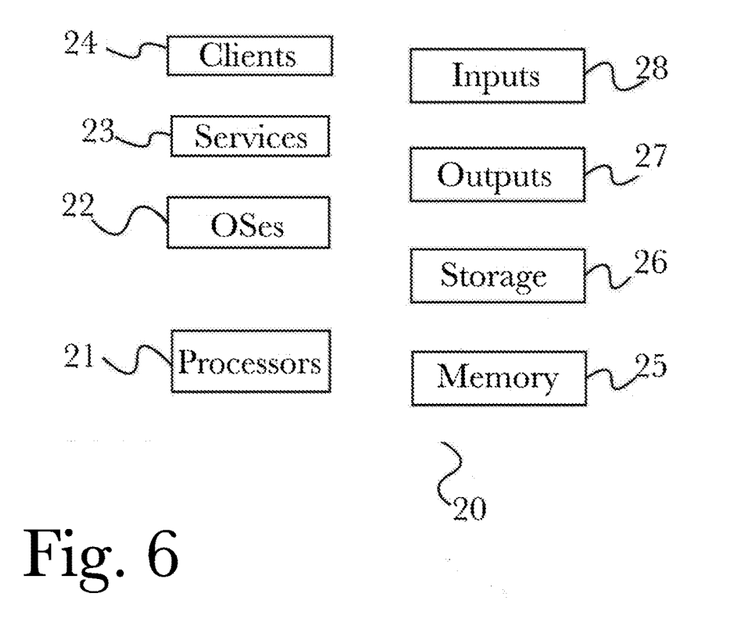
FIG. 6 is a block diagram illustrating an exemplary logical architecture for a client device, according to a preferred embodiment of the invention.

In some embodiments, systems may be implemented on a standalone computing system. Referring now to FIG. 6, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 5). Examples of storage devices 26 include flash memory, magnetic hard drive, CD-ROM, and/or the like.

Figure 7:
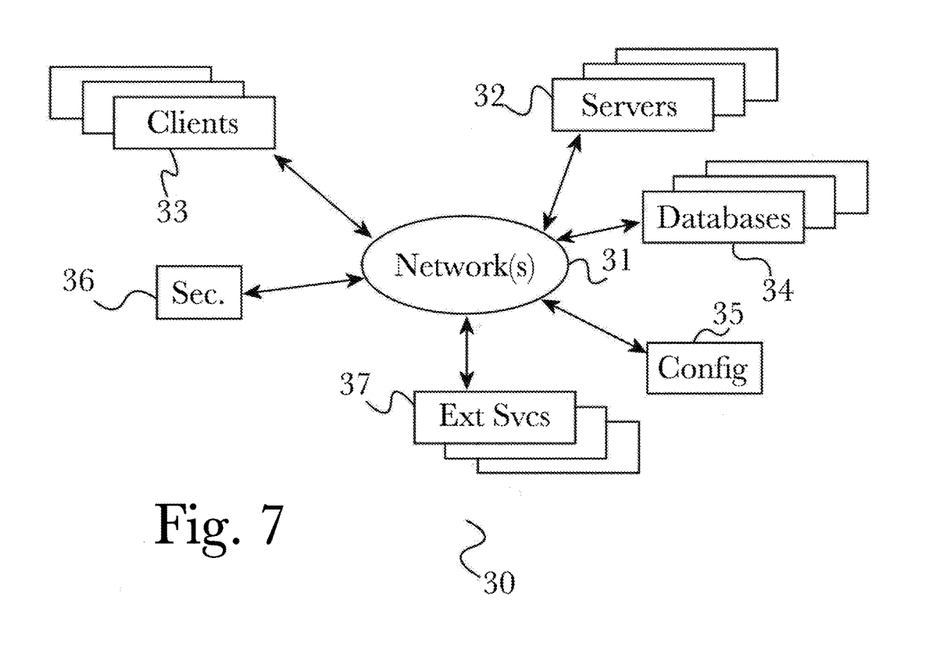
FIG. 7 is a block diagram showing an exemplary architectural arrangement of clients, servers, and external services, according to a preferred embodiment of the invention.

In some embodiments, systems may be implemented on a distributed computing network, such as one having any number of clients and/or servers. Referring now to FIG. 7, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 6. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 8:
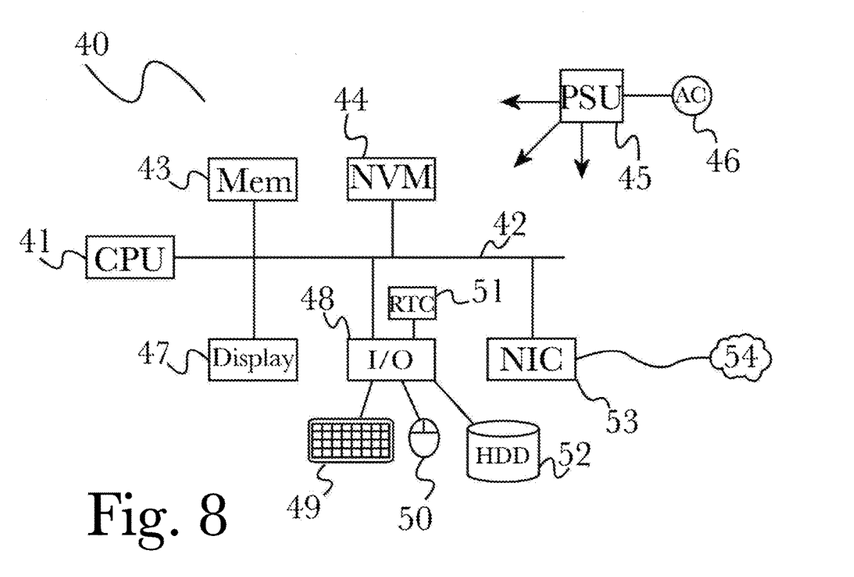
FIG. 8 is another block diagram illustrating an exemplary hardware architecture of a computing device, according to a preferred embodiment of the invention.

FIG. 8 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

What is claimed is:

1. A system for directing an image capture device based on motion comprising:
   a device direction computer comprising at least a processor, a memory, and a plurality of programmable instructions stored in the memory and operating on the processor, wherein the programmable instructions, when operating on the processor, cause the processor to determine a threshold for device direction comprising:
   a plurality of hardware sensors;
   a sensor aggregator for analyzing sensor data;
   a polling module communicatively connected to the plurality of hardware sensors;
   a threshold calculator;
   wherein the sensor aggregator is operable to a receive a plurality of motion points from the polling module;
   wherein the threshold calculator is operable to iteratively:
     calculate a weighted average of motion data, using the plurality of motion points, over a last interval, wherein the weighted average is based on a length of the last interval;
     calculate a motion threshold;
     set a motion threshold based on comparisons the weighted average of motion data to the motion threshold;
   directing the device.

2. The system of claim 1, further comprising:
   a user database;
   wherein the threshold calculator is further operable to:
     check for a user profile in the database, the user profile associated to the device;
     wherein if the user profile exists, the threshold calculator loads motion threshold configuration information associated to the device;
     overriding the motion threshold.

3. The system of claim 1, wherein the plurality of hardware sensors comprises at least an accelerometer.

4. The system of claim 1, wherein the plurality of hardware sensors comprises at least a gyroscope.

5. The system of claim 1, wherein at least a portion of the sensor data is stored, by the threshold calculator, in the database, for future reference.

6. The system of claim 1, wherein the device comprises a digital camera.

7. A method for directing a device comprising the steps of:
   (a) receiving, at a sensor aggregator, a plurality of motion points from a polling module, the polling module monitoring a plurality of hardware sensors on a device;
   (b) calculating, by a threshold calculator, a weighted average of motion data, using the plurality of motion points, over a last interval, wherein the weighted average is based on a length of the last interval;
   (c) calculating, by the threshold calculator, a motion threshold;
   (d) comparing, by the threshold calculator, the weighted average of motion data to the motion threshold;
   (e) if the weighted average of motion data is higher than the motion threshold, repeating the previous steps restarting at step (a);
   (f) otherwise, rechecking, by the sensor aggregator the plurality of motion points and comparing, by the threshold calculator, to the motion threshold;
   (g) if the rechecked plurality of motion points is higher than the motion threshold, repeating the previous steps restarting at step (a);
   (h) otherwise, directing the device.

8. The method of claim 7, wherein the step of calculating the motion threshold comprises the steps of:
   (c1) receiving, at the threshold calculator, a current elapsed time for the device; checking, by the threshold calculator, a first elapsed time:
   (c2) if the first elapsed time is zero, setting, by the threshold calculator, the first elapsed time equal to the elapsed time;
   (c3) otherwise, setting, by the threshold calculator, a previous elapsed time equal to the elapsed time and raising, by the threshold calculator, a motion threshold;
   (c4) if the current elapsed time is greater than the previously elapsed time, raising, by the threshold calculator, the motion threshold;

(c5) if the first elapsed time when subtracted from current elapsed time is greater than the motion threshold, finalizing, by the threshold calculator, the motion threshold;

(c6) otherwise, receiving, from the device, a shutter speed setting;

(c7) if the shutter speed is below a prespecified shutter speed threshold, lowering the threshold, and finalizing the motion threshold;

(c8) otherwise, raising the motion threshold, and finalizing the motion threshold.

9. The method of claim 7, further comprising the steps of:

checking, by the threshold calculator, for a user profile, the user profile associated to the device;

if the user profile exists, loading, by the threshold calculator, motion threshold configuration information associated to the device;

overriding the motion threshold.

* * * * *